Jan. 3, 1950
C. S. MOORE ET AL
2,493,012
BALANCED-DIAPHRAGM DYNAMOMETER TORQUE INDICATOR
Filed Sept. 30, 1944
3 Sheets-Sheet 3
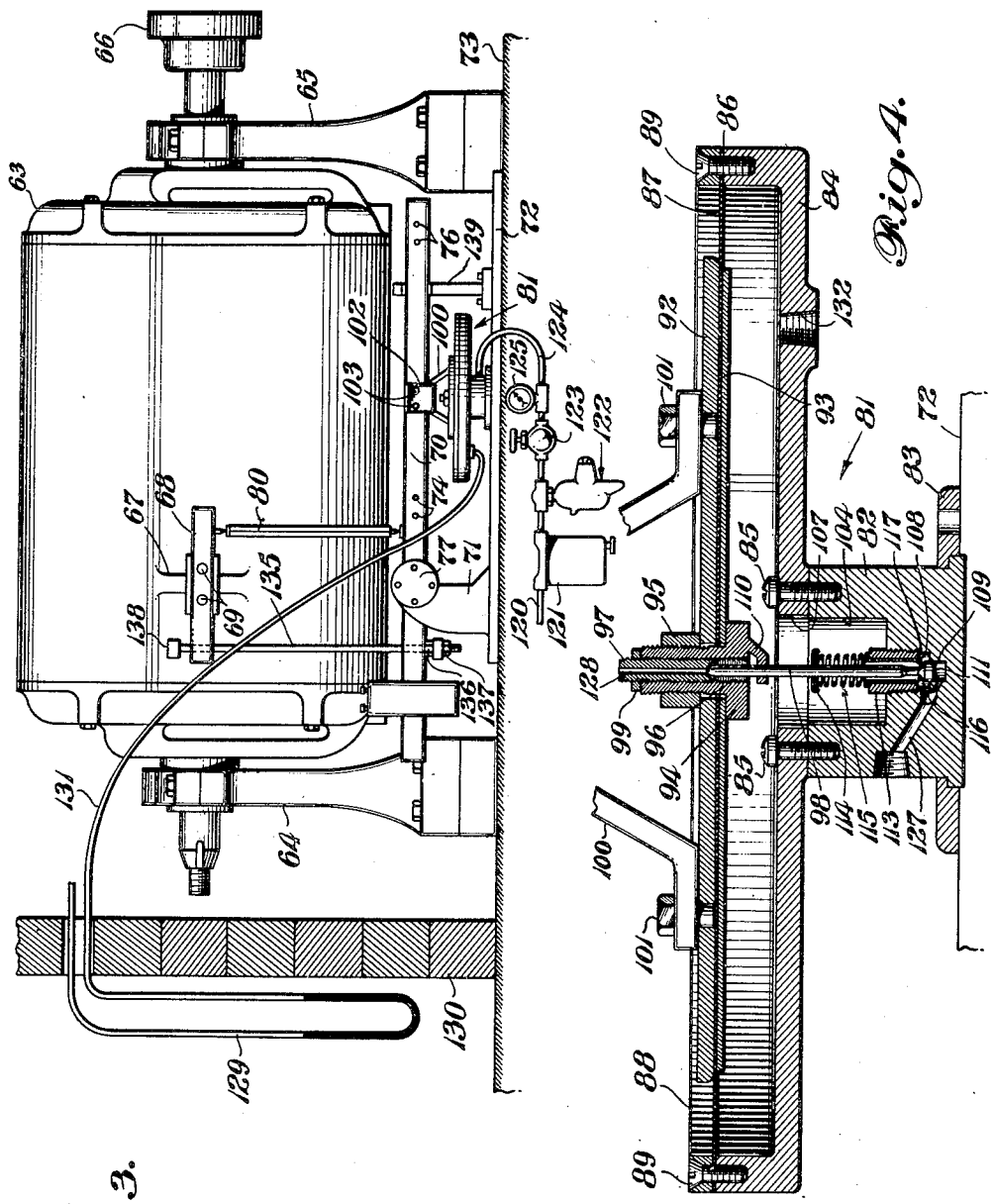
Inventors
Charles S. Moore,
Arnold E. Biermann
and Fred Voss.
By W. Glenn Jones
Attorney Patented Jan. 3, 1950

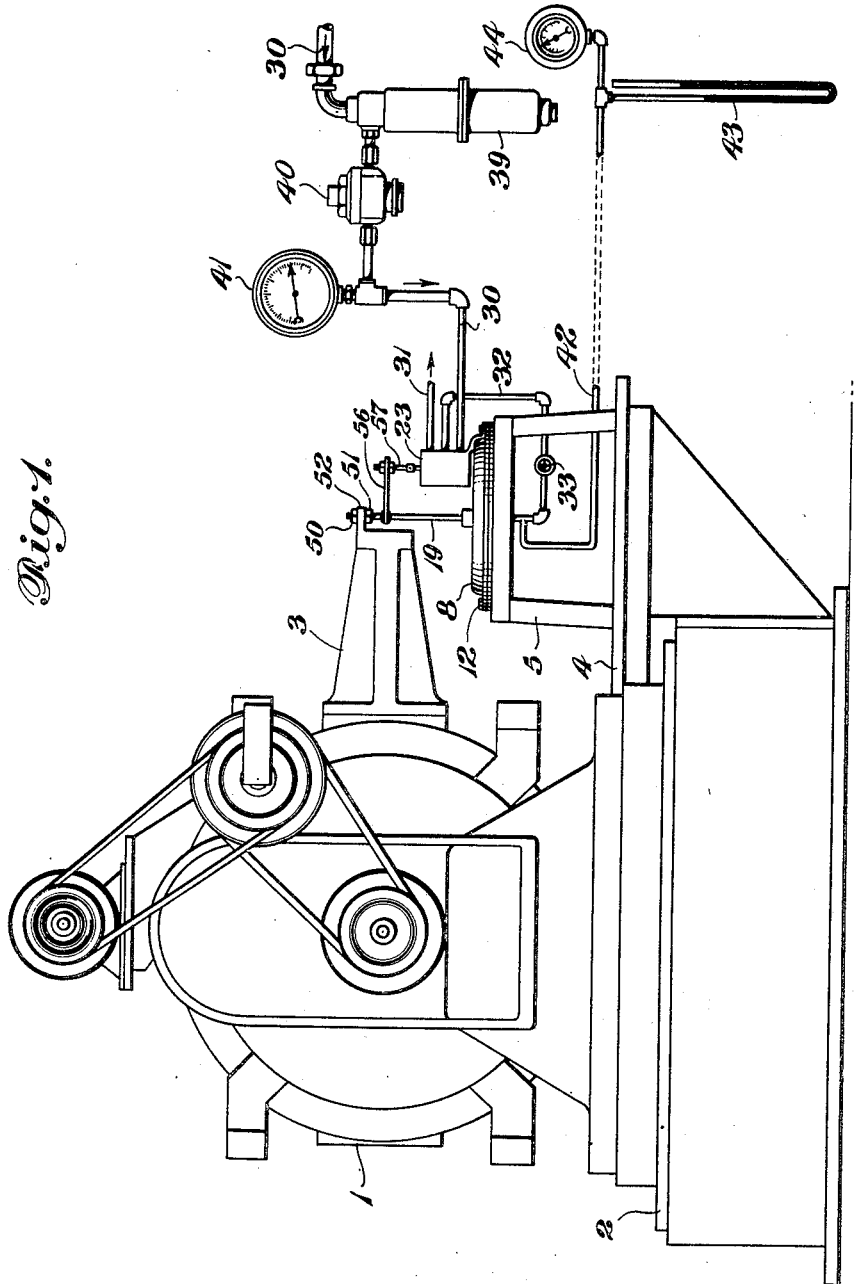

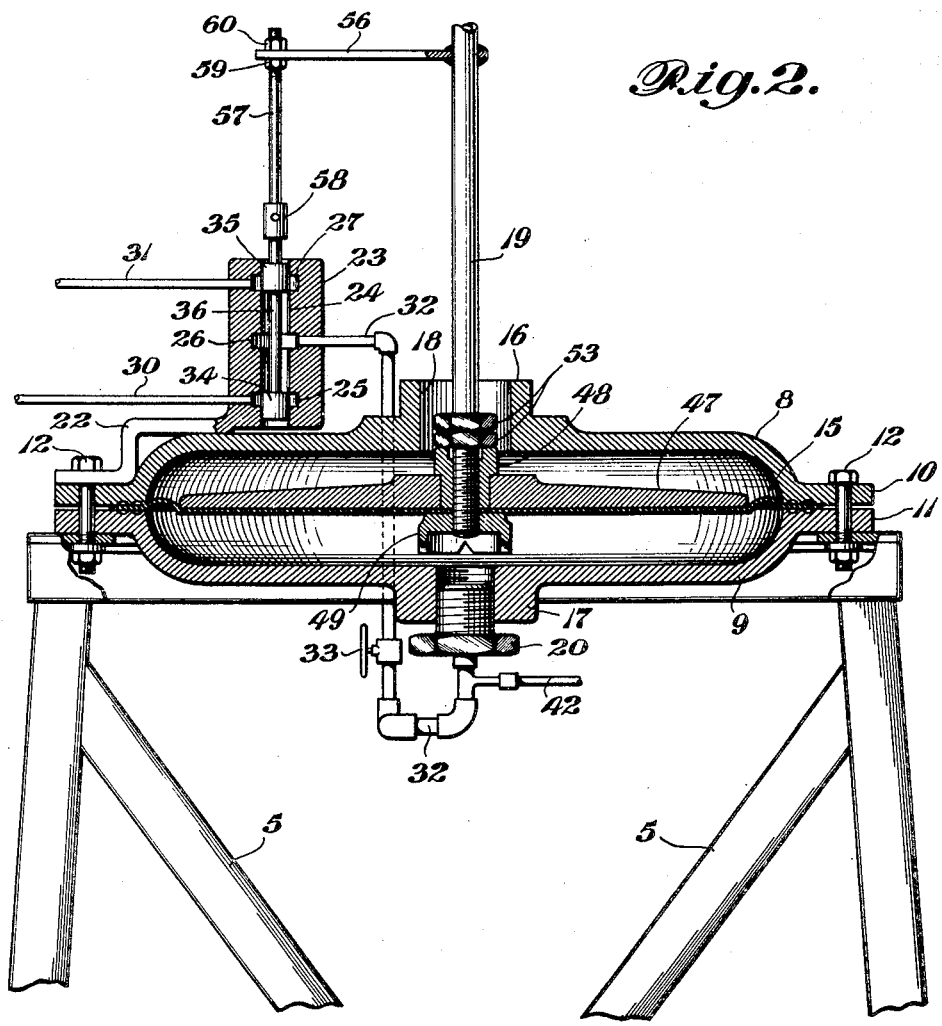

2,493,012

UNITED STATES PATENT OFFICE 2,493,012

BALANCED-DIAPHRAGM DYNAMOMETER TORQUE INDICATOR

Charles S. Moore, Cleveland, Fred Voss, Lakewood, and Arnold E. Biermann, Cleveland, Ohio Application September 30, 1944, Serial No. 556,644

4 Claims. (Cl. 73—134)

(Granted under the act of March 3, 1883, as amended April 30, 1928; 370 O. G. 757)

This invention relates to force measuring devices, and in particular to devices for measuring dynamometer torque.

In the testing of engines and other prime movers, various types of dynamometers are used, and many types of devices have been used to measure the dynamometer torque. A torque measuring device should have an accuracy of plus or minus 0.5 per cent and the readings should be remotely indicated. The indication should be unaffected by temperature, pressure and elevation with respect to the dynamometer. The measuring device should be rugged so that a calibration will be maintained over long periods of time; its calibration should be substantially a straight line without hysteresis; and the device should be unaffected by vibration.

It is the object of the invention to provide an improved dynamometer torque measuring device for laboratory use, of simple and rugged construction and which satisfies the above requirements.

Other objects will become apparent as the description proceeds in connection with the accompanying drawings, in which:

Fig. 1 is a schematic layout of one embodiment of the invention;

Fig. 2 is an enlarged sectional view of the diaphragm and diaphragm pressure control valve of the embodiment shown in Fig. 1;

Fig. 3 is a schematic layout of another embodiment of the invention; and

Fig. 4 is an enlarged sectional view of the combined diaphragm and pressure control valve of the embodiment shown in Fig. 3.

As illustrated in Fig. 1 a dynamometer 1 is suitably mounted on a base 2. Attached to the dynamometer housing is a dynamometer torque arm 3 which extends horizontally from the housing so that its outer end can be connected to the torque measuring device.

Fastened to the base 2, and under the torque arm, is a platform 4 which supports a stand 5. A diaphragm housing comprising an upper shell 8 and a lower shell 9 is fastened to the top of the stand by means of bolts 12 which pass through mating flanges 10 and 11 on the periphery of the upper and lower shell respectively, as shown in detail in Fig. 2. A flexible diaphragm 15 divides the interior of the housing, the diameter of the diaphragm being larger than the interior diameter of the housing, and its edge portions being clamped in an airtight manner between the flanges 10 and 11 of the upper and lower shells. In a plan view, which is not shown, the diaphragm housing and diaphragm are circular in shape.

The upper and lower shells 8 and 9 have central aligned bosses 16 and 17 respectively. The boss 16 has a large bore 18 therethrough which provides a vent to the atmosphere from that part of the diaphragm housing above the diaphragm, and also provides a passageway for a vertical stem 19 which forms a connection between the diaphragm 15 and the torque arm 3. The boss 17 has a tapped bore into which is threaded a pipe fitting 20.

Fastened to the flange 10 by one of the bolts 12 and a bracket 22 is a valve housing 23 having an axial bore 24. The bore has three axially spaced enlarged portions forming annular ports 25, 26, and 27. The central port 26 is connected to the pipe fitting 20 by a pipe 32. The lower port 25 is connected to an air pressure line 30, and the upper port 27 exhausts to the atmosphere as by an exhaust line 31. A needle valve 33 is incorporated in line 32 for a purpose to be described.

As shown in Fig. 2, a pair of spaced pistons 34 and 35 are mounted on a piston rod 36. When in the position shown in Fig. 2 the piston rod is in its mid-position, port 25 being closed by piston 34 and port 27 being closed by piston 35. A slight downward movement of the piston rod will cause piston 34 to uncover port 25, and air under pressure will flow from line 30, through port 25 and the axial bore 24, through port 26, pipe 32, and fitting 20 into the lower shell 9 and the space below the flexible diaphragm 15. During this operation the port 27 will remain closed by the upper piston 35. If however, the piston rod moves upward from its mid position, it will uncover port 27 and the air under pressure in the lower shell and below the diaphragm may exhaust to the atmosphere via pipe 32, port 26, bore 24, port 27 and exhaust line 31. During this exhaust operation the port 25 remains covered by the lower piston 34. The distance between the pistons 34 and 35 is such that while the two ports 25 and 27 are closed by the pistons when the piston rod is in its mid position, the slightest movement upwardly or downwardly will uncover port 27 or port 25 respectively.

As shown in Fig. 1, the air which flows through the pressure line 30 comes from a source of high pressure air, passes through an air filter and water trap 39, then through an adjustable reducing valve 40 and to the valve housing 23. A pressure gage 41 measures the pressure of the air on the low pressure side of the reducing valve.

A U-tube manometer 43 is connected by means of a pipe 42 to the pipe 32 closely adjacent to the point where it enters the fitting 20, the manometer thereby measuring the pressure in the lower shell 9 below the diaphragm. A pressure gage 44 is also connected to the pipe 42.

The diaphragm 15 is a Neoprene impregnated fabric. As described previously its edges are clamped in an air-tight manner between the flanges 10 and 11. A loading disk 47 shown in Fig. 2 has a diameter slightly less than the diameter of the unclamped portion of the diaphragm and lies on top of the diaphragm as shown. The stem 19 passes through both the disk and the diaphragm, there being nuts 48 and 49 which clamp the diaphragm and disk to the stem in an airtight manner.

As shown in Fig. 1, the stem 19 extends vertically and passes through a lip 52 or the like on the torque arm 3, there being nuts 50 and 51 to fasten the stem to the lip and to permit vertical adjustment of the stem with respect to the lip. Vertical adjustment of the stem with respect to the disk and diaphragm is also permitted by the nuts 48 and 49, there being lock nuts 53 to prevent their loosening after adjustment.

A horizontal yoke 56 is fastened to the stem 19 as by welding. The piston rod 36 has an extension 57 pivoted thereto by a pivotable joint 58, the extension 57 passing through the yoke 56 and being vertically adjustable therein by means of nuts 59 and 60.

In operation, in the embodiment of Figs. 1 and 2, the dynamometer tends to rotate in a clockwise direction as viewed in Fig. 1 and the torque arm 3 therefore moves downwardly towards the stand 5. Air pressure from the pressure line 30 passes through the valve housing 23 via port 25, bore 24 and port 26, thence through pipe 32 to the lower shell 9 into the space below the diaphragm. The pressure of this air against the under side of the diaphragm exerts a force against the stem 19 in an upward vertical direction to resist the downward thrust of the torque arm 3. As soon as the pressure within the lower shell 9 is sufficient to balance the downward thrust of the torque arm the diaphragm 15 with its disk 47 and the stem 19 will come to rest in their neutral position. By means of the yoke 56 the piston rod 36 follows the vertical movements of the stem 19, and so when the stem 19 is in its neutral position the piston rod 36 will also be in its neutral position as shown in Fig. 2 where both the ports 25 and 27 are closed by the pistons 34 and 35 respectively. Since the system is airtight the stem 19, diaphragm 15, etc. will remain in this neutral position as long as the downward thrust of the torque arm 3 remains constant.

Upon a decrease in the torque developed by the prime mover, which will result in a decrease of the downward thrust of the torque arm 3 the pressure underneath the diaphragm will consequently raise the stem 19 and rotate the torque arm 3 counterclockwise. Immediately as soon as the stem 19 rises, the piston rod 36 simultaneously rises, thus uncovering the port 27 and allowing some of the air under pressure in the lower shell 9 to exhaust through line 31 to the atmosphere. This decrease in the air pressure continues until the upward thrust of the stem 19 exactly equals the decreased downward thrust exerted by the torque arm 3. Since these two forces are now balanced the stem 19 and the diaphragm 15 return to their neutral position and return the piston rod 36 to its neutral position so that both ports 25 and 27 are closed.

If on the contrary, the prime mover should develop an increased torque which thereby exerts an increased downward thrust upon the stem 19, this increased thrust will overcome the air pressure acting upon the bottom of the diaphragm 15 and consequently the stem 19 and piston rod 36 will move downwardly. This results in the uncovering of port 25 and the admission of an increased air pressure, which results in an upward thrust through stem 19 which will equal the increased downward thrust of the torque arm 3. The diaphragm 15, stem 19 and associated piston rod 36 will return to their neutral positions and ports 25 and 27 are both closed.

It is thus seen that any slight increase or decrease in torque developed by the prime mover will be immediately counter-acted by an increase or decrease in the air pressure acting against the diaphragm 15 and this diaphragm will always remain substantially in its neutral position, even during the intervals during which it is displaced due to a period of changing torque. The spacing of the pistons 35 and 34 is such that they immediately uncover either port 25 or port 27 as soon as the piston rod 36 is even slightly displaced from its neutral position. With ordinary pressures underneath the diaphragm 15 it has been found that there is no appreciable hunting of the diaphragm or valve and the associated parts. When the air pressures under the diaphragm are comparatively large due to large torques developed by the prime mover it has been found that there is an increased tendency of the diaphragm and valve to hunt, but this tendency can be overcome by adjustment of the needle valve 33 in the pipe 32.

The choice of size of the diaphragm 15 is determined by the load and desired manometer pressure. The most sensitive action is obtained with a diaphragm of large area inasmuch as the diaphragm area varies as the square of the effective diaphragm diameter, whereas the circumference of the diaphragm which governs the force required to move the diaphragm itself varies directly as the diameter. The diaphragm thickness, which in general is an inverse function of its flexibility, should be as small as it is consistent with the required strength. Air pressures as high as 25 lbs. per sq. in. have been used with a $\frac{1}{32}$ inch thick Neoprene impregnated fabric diaphragm where the diaphragm is approximately 10 inches in diameter.

The diameter of the loading disc 47 should be as large as practicable without decreasing the flexibility of the free portions of the diaphragm. In an installation similar to that shown in Fig. 2 the diameter of the loading disc 47 is 9 inches and the diameter of the diaphragm between the points where it is clamped between the flanges 10 and 11 is 10¼ inches. The portion of the diaphragm normally contacting the underside of the disc 47 may be cemented thereto or it may be maintained in contact with the underside of the disc 47 by a disc between the nut 49 and the diaphragm 15, such as that shown at 93 in Fig. 4. The disc may be of substantially the same diameter as disc 47, but need not be of the same thickness as disc 47 since its only function is that of pressing the diaphragm against disc 47. Care must be taken that no air leaks be permitted where stem 19 passes through the diaphragm or at the edges of the diaphragm where they are clamped between flanges 10 and 11. With a construction as described in connection with Figs. 1 and 2 the maximum movement of the diaphragm, piston rod and the associated elements is less than 0.030 in.

with changing load due to variations in the torque developed by the prime mover.

The pressures in the shell 9 are measured by the manometer 43 which may have any liquid having a suitable density, depending upon the pressures to be measured. Since the lines 42, 32, etc. are air filled, the manometer may be placed at any elevation with respect to the level of the diaphragm 15 without any errors in the indication.

In the embodiment of Figs. 3 and 4, a dynamometer 63 is suitably mounted in the trunnions 64 and 65 and a prime mover (not shown) is connected to the shaft of the dynamometer at the flange 66 on the dynamometer shaft.

A torque arm 67 extends in a horizontal direction from the dynamometer housing. A yoke 68 is fastened to the torque arm by means of cap screws 69. Below the torque arm is a scale arm 70 pivotally connected at 77 to a stand 71 which is fixed to a base 72. The base 72 is suitably fixed to any support such as the floor 73 to which the trunnions 64 are fastened. The scale arm 70 is provided with a series of spaced holes 74, 75 and 76 as shown in Fig. 3, to the right of the pivot 77, the holes 75 being obscured by the bracket 102.

A connecting link 80 connects the yoke 68 to the scale arm 70 as shown in Fig. 3. In operation the normal load applied to the dynamometer 63 is such that the torque arm 67 and the link 80 move downwardly when viewed as in Fig. 3. This downward movement tends to rotate the scale arm 70 in a clockwise direction about its pivot 77. This rotation is resisted by the combined diaphragm and pressure control valve device 81 indicated generally in Fig. 3 and shown in an enlarged sectional view in Fig. 4. The device 81 has a central support 82 which is fastened to the base 72 in any suitable manner such as by a flange 83. On top of the stand 82 is a shallow cup 84 which is fastened to the support 82 by screws 85. The top edge 86 of the cup 84 is smoothly finished in a horizontal plane. A diaphragm 87 has its edge portion clamped between the top edge 86 and a ring 88 which is fastened to the top edge 86 by means of spaced screws 89 which pass through the diaphragm and are tapped into blind holes in the walls of the cup 84.

A disc 92 overlies the diaphragm 87 and a thinner disc 93 of substantially the same diameter underlies the diaphragm, the two discs being in axial alignment. A hollow screw 94 passes through the center of the discs 92 and 93 and the diaphragm, and a nut 95 externally threaded on the screw 94 clamps the two discs and the diaphragm together and seals the opening through the diaphragm against air leaks. The screw 94 has a central threaded passageway 96 into which is threaded a valve seat 97 which has an axial passage 128 therethrough. At its bottom, the valve seat has a conical recess so that a valve 98, when pressed against the conical surface, will close the passageway. The valve seat 97 is vertically adjustable within the threaded passage 96 and may be fixed in position by a lock nut 99.

A spider 100 is fastened to the top of the disc 92 by cap screws 101 which are threaded into the disc 92 but are short so that they do not extend beyond the bottom surface thereof and contact the diaphragm 87. At their upper ends the legs of the spider 100 are joined to a bracket 102 which is U-shaped in cross-section with a vertical leg extending upwardly on each side of the scale arm 70. A pair of pins 103 pass through the vertical legs of the bracket and through the holes 75 (not shown) in the scale arm.

The support 82 has a chamber 104 therein which is aligned with a central hole 107 through the bottom of the cup 84. A tapped hole 108 extends below the chamber 104 as shown in Fig. 4 and terminates in a guide hole 109, having a smaller diameter. The valve 98 which has a vertical sliding movement has an upper guide provided by a strut 110 which extends from the head of the screw 94, and its lower end 111 is guided by the guide hole 109. A threaded bushing 113 is threaded into the hole 108 and has a central passageway through which the valve 98 passes. A washer 114 is fixed to the valve 98 and a spring 115 is compressed between the washer and the top of the bushing 113, thus urging the valve 98 vertically upwards. Adjacent its lower end 111 the valve 98 has a conical portion 116 which engages a seat on the bottom of a tube 117 which is fixed in the center passageway of the bushing 113. The bushing 113 is vertically adjustable in the threaded hole 108 to adjustably position the tube 117. The upward movement of the valve 98 is limited by the engagement of its conical portion 116 with the seat on the bottom of tube 117.

The valve seat 97 and the bushing 113 are so positioned, and the length of the valve 98 is such that when the diaphragm 87 together with the discs 92 and 93 are in their neutral position the valve 98 closes the central passageway through the valve seat 97 and the conical portion 116 of the valve 98 simultaneously sets against the bottom of the tube 117 to close the passageway therethrough.

Air under pressure from line 120 passes through a filter and water trap 121 thence to the reducing valve 122, needle valve 123 and line 124 as shown in Fig. 3 to a passageway 127 in the support 82. A pressure gage 125 measures the pressure in line 124.

The downward force on the scale arm 70 which tends to rotate it in a clockwise direction is counter-acted by the upward force exerted on the scale arm by the spider 100 and bracket 102 due to the air pressure underneath the diaphragm 87. In operation, when the downward thrust of the scale arm 70 overcomes the upward thrust due to the air pressure, the scale arm forces the spider 100 and the diaphragm 87 downwardly. Since the valve 98 is in engagement with the valve seat 97, the downward movement of the diaphragm 87 and the discs 92 and 93 forces the valve 98 vertically downwardly and unseats the conical portion 116 of valve 98 from the bottom of the tube 117, thus allowing the air under pressure from line 124 to pass through the tube 117 and increase the air pressure under the diaphragm until the total force exerted on the diaphragm is sufficient to balance the downward thrust of the scale arm 70.

If on the other hand the downward thrust exerted by the scale arm 70 should decrease due to a reduction in torque by the prime mover under test, the diaphragm 87, spider 100, etc., will move upwardly under the influence of excessive air pressure. The valve 98 cannot move upwardly with the diaphragm because of the engagement of the conical portion of the valve with the bottom of tube 117. Therefore, immediately upon the slightest upward movement of the diaphragm and consequently of the valve seat 97 from their neutral position the central passageway 128 through the valve seat 97 is opened to communication with the space under the diaphragm because the top of the valve 98 becomes displaced from the conical recess at the bottom of the valve seat 97.

In this embodiment it should be noted that a separate exit to the atmosphere is provided to reduce the pressure under the diaphragm whereas in the embodiment in Figs 1 and 2 the same passage 32 provides both an exit and an entrance for the air under the diaphragm. With the adjustable valve seats of the embodiment of Fig. 4 in proper position with respect to the valve 98, when the diaphragm is in its neutral position it has been found that the maximum movement of the diaphragm when accommodating itself to a changing torque is less than 0.015 inch.

A manometer 129 may be positioned on an engine room wall 130 as shown in Fig. 3, and is connected by a line 131 and a tapped opening 132 to the interior of the cup 84 under the diaphragm.

In the embodiment of Figs. 3 and 4 a substantial range is provided because of the fact that the device 81 may be shifted to various positions under the scale arm so that the bracket 102 can be engaged with the sets of holes 74, 75 or 76 at various distances along the scale arm from its pivot 77. For reverse operation of the dynamometer the device 81 may be similarly connected to the scale arm as in normal direction of rotation of the dynamometer, and instead of using the connecting link 80 a tension connecting link 135 which is shown in Fig. 3 passes through the yoke 68 and the scale arm 70 on the opposite side of its pivot. Nuts 136 and 137 with an intervening washer on the bottom of the tension link 135 may be tightened or loosened at suitable positions thereon to connect or disconnect respectively the yoke 68 to the left arm of the scale lever 70. The top of the link 135 may pass through the yoke 68 as shown, there being a nut 138 at its upper end. The scale arm 70 is provided with a stop 139 near its outer end, to prevent damage to the apparatus by excessive torques in either direction.

The air balance diaphragm type of force measuring instruments described and illustrated have proven to be rugged and adaptable. In both the embodiment shown in Figs. 1 and 2 and in the embodiment of Figs. 3 and 4 it is essential that the intake and discharge ports function simultaneously in order to avoid excessive movement of the diaphragm and possible hunting.

Because the precision of measurement can be no more accurate than the precision of reading the scale, it is imperative that the manometer be of sufficient length to insure the desired readable accuracy. Liquids of various densities may be used in the manometers depending upon the torques to be measured and the readable accuracy desired. The use of air as a transmitting medium makes it convenient to locate the manometer at any elevation with respect to the diaphragm without the necessity of corrections in pressure head. Furthermore, the use of air in the transmission lines makes it readily possible to connect two or more remotely located indicating manometers in parallel and, where the tests require a complete time record of the torque, to provide a chart recorder. Where the dynamometer torques to be measured are unusually high the dynamometer may be loaded with fixed weights to bring the manometer readings within the desired range. In the embodiment of Figs. 3 and 4 a large range of torques may be measured because of the provision for changing the mechanical advantage of the pressure exerting device 81 by connecting it at various locations along the scale beam. It is obvious to those skilled in the art that the pressure exerting device shown in Fig. 2 may be adapted to cooperate with a scale arm 70 in place of the embodiment shown in Fig. 4.

Calibration of the embodiments shown in the drawings show that there is no hysteresis in the apparatus so that calibrations with decreasing loads will be the same as calibrations for increasing loads. A straight line calibration is obtained, this being of considerable advantage and leading to general over-all accuracy of tests. Stability of calibration has been found to be excellent. A change in the relationship of the valves governing the admission and discharge of air to the diaphragm chambers generally require a new calibration unless care is taken to accurately reproduce the initial settings. This is done by adjusting the screw or valve 97 until a definite size gage pin just slides under the beam 70 adjacent its end. In one physical embodiment a gage pin exactly five inches was utilized. It has been found that calibrations are reproducible even under vibrating loads. This feature is of considerable importance when the apparatus is used on dynamometer bed plates that are mounted on springs. Experiments have shown that a considerable variation in the air pressure supplied has no appreciable effect on the calibration of the apparatus.

It will be understood that the above description and accompanying drawings comprehend only the general and preferred embodiments of the invention and that various changes in construction, proportion and arrangement of the parts may be made within the scope of the appended claims without sacrificing any of the advantages of the invention.

The invention described herein may be manufactured and used by or for the Government of the United States of America for governmental purposes without the payment of any royalties thereon or therefor.

What is claimed is:

1. Torque measuring apparatus comprising a dynamometer freely mounted in bearing supports on a base plate and tending to move under the force of a torque to be measured, a pressure chamber movable on said base plate and having a flexible wall, adjustable means connecting the dynamometer to said flexible wall for transmitting the torque from said dynamometer to said flexible wall, valve means cooperating with said flexible wall and connecting to a source of pressure and to the atmosphere for admitting pressure to or releasing pressure from said pressure chamber to balance said dynamometer torque, said adjustable means comprising a lever having a fulcrum and arms connected to said dynamometer and to said flexible wall respectively, the arm connected to said flexible wall being substantially parallel to said base plate and having means for selectively connecting it to said flexible wall at varying distances from its fulcrum for operation at widely differing range of torques.

2. Torque measuring apparatus comprising a dynamometer freely mounted in bearing supports on a base plate and tending to move under the force of a torque to be measured, a pressure chamber movable on said base plate and having a flexible wall, adjustable means connecting the dynamometer to said flexible wall for transmitting the torque from said dynamometer to said flexible wall, valve means cooperating with said flexible wall and connecting to a source of pressure and to the atmosphere for admitting pressure to or releasing pressure from said pressure chamber to balance said dynamometer torque, said adjustable means comprising a lever having a fulcrum and arms connected to said dynamometer and to said flexible wall respectively, the arm connected to said flexible wall being substantially parallel to said base plate, and means for adjusting the length of said arm comprising a spider secured to said flexible wall, and means for securing said spider at any one of several positions along said lever.

3. Torque measuring apparatus comprising a dynamometer freely mounted in bearing supports on a base plate and tending to move under the force of a torque to be measured, a pressure chamber movable on said base plate and having a flexible wall, adjustable means connecting the dynamometer to said flexible wall for transmitting the torque from said dynamometer to said flexible wall, valve means cooperating with said flexible wall and connecting to a source of pressure and to the atmosphere for admitting pressure to or releasing pressure from said pressure chamber to balance said dynamometer torque, said adjustable means comprising a lever having a fulcrum and arms connected to said dynamometer and to said flexible wall respectively, the arm connected to said flexible wall being substantially parallel to said base plate, and means for adjusting the length of said arm comprising a spider secured to said flexible wall, means for securing said spider at any one of several positions along said lever, and a pair of links between said dynamometer and said lever having lost motion connections at opposite sides of said fulcrum for transmitting the force of the dynamometer torque acting in either direction to said flexible wall in the same operative direction.

4. Torque measuring apparatus as defined in claim 3, an adjustable balance weight slidably mounted on said lever for balancing the weight of said spider and wall, and a stop member for said lever mounted rigidly on said base plate near the end of the arm connected to said spider.

CHARLES S. MOORE.
FRED VOSS.
ARNOLD E. BIERMANN.

REFERENCES CITED

The following references are of record in the file of this patent:

UNITED STATES PATENTS

| Number | Name | Date |
| --- | --- | --- |
| 751,295 | Jones | Feb. 2, 1904 |
| 1,580,430 | Gaines | Apr. 13, 1926 |
| 2,013,222 | Thomas | Sept. 3, 1935 |
| 2,013,810 | Shimek | Sept. 10, 1935 |
| 2,121,623 | Bobek | June 21, 1938 |
| 2,131,486 | Spitzglass | Sept. 27, 1938 |
| 2,235,279 | Bunker | Mar. 18, 1941 |
| 2,313,509 | Bohannan | Mar. 9, 1943 |
| 2,336,838 | Bennett | Dec. 14, 1943 |
| 2,345,732 | Davies et al. | Apr. 4, 1944 |

FOREIGN PATENTS

| Number | Country | Date |
| --- | --- | --- |
| 275,985 | Germany | July 1, 1914 |